April 12, 1938.  L. A. LEPPKE  2,113,920
SERVING DEVICE
Filed April 23, 1937  2 Sheets-Sheet 2

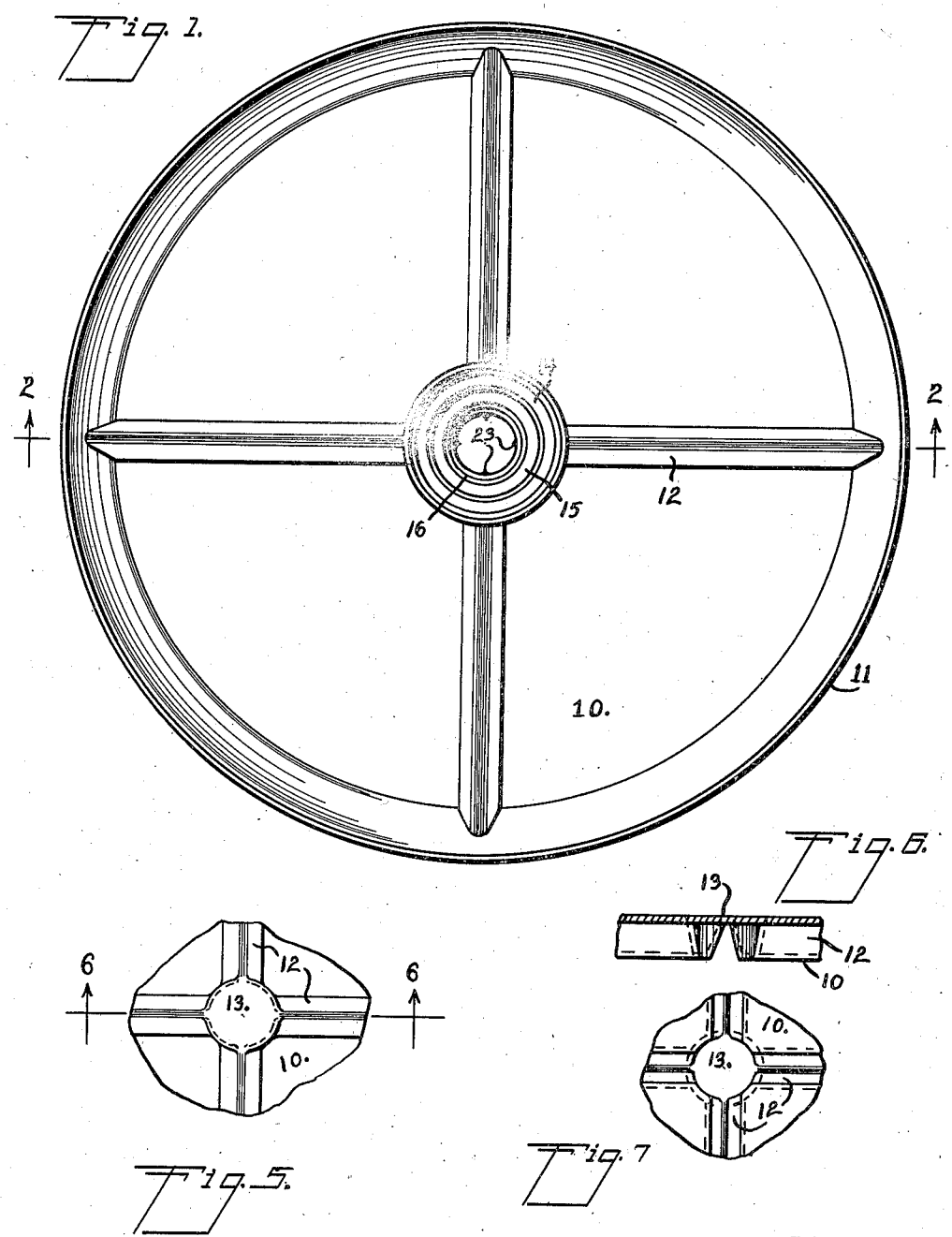

INVENTOR.
LOUIS A. LEPPKE.
BY John C. Baisch
ATTORNEY.

Patented Apr. 12, 1938

2,113,920

UNITED STATES PATENT OFFICE 2,113,920

SERVING DEVICE

Louis A. Leppke, Omaha, Nebr.

Application April 23, 1937, Serial No. 138,626

3 Claims. (Cl. 65—15)

This invention relates generally to serving devices and particularly to devices for serving lap lunches, Dutch lunches, and for lunch service on speed trains, airplanes, cafeterias and the like.

In serving lunches on ordinary trays or plates, the cup or glass for the beverage served therewith is difficult to hold on such trays or plates and said cup or glass is likely to slip and slide about thereon and come into contact with the food on the tray thereby making the cup or glass messy and sticky to handle.

It is therefore an object of my invention to provide a serving device having means for holding a cup or glass or the like out of contact with the food on the tray.

It is another object of my invention to provide a device of this character that is convenient and compact for serving lunches and the like thereon.

It is a further object of my invention to provide a device of this character constructed of metal and having two parts that may be stamped.

A further object is to provide a device of this character wherein the parts are rigidly and permanently secured together in a simple and effective manner.

Other objects of the invention are to provide a device of this character wherein cups or glasses of various sizes may be securely but removably held in the holder, and wherein containers of various shapes may thus be held in said holder.

A still further object of the invention is the provision of a device of this character of simple and durable construction and of low manufacturing cost.

Numerous other objects and advantages of this invention will be apparent as it is better understood from the following detailed description, which, taken in connection with the accompanying drawings, discloses preferred embodiments thereof.

Referring to the drawings:

Figure 1 is a plan view of my assembled serving device.

Figure 5 is a partial plan of the central portion of the tray showing the seat for the holder member.

Figure 6 is a vertical section of same taken on line 6—6 of Figure 5.

Figure 7 is a view of the under side of same.

Figure 3:
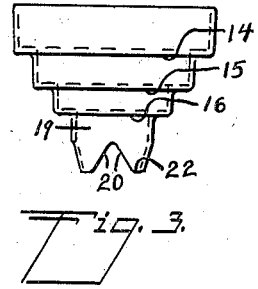
Figure 3 is an elevational view of the holding member detached from the plate before being secured thereto.

Referring more particularly to the drawings, which illustrate a preferred embodiment of my invention and a modified embodiment thereof, the device comprises a tray 10 stamped from sheet metal. The tray has an upturned edge 11 and is provided with partitions or ribs 12 raised from the bottom of said tray and formed integrally therewith. Adjacent the center of the tray is a raised horizontal holder seat 13 formed by stamping and being an integral part thereof.

The preferred holding member, Figures 1 to 4 inclusive, is also stamped out of metal, or may be drawn therefrom, and is hollow. Said holding member is provided with a series of vertically spaced shoulders stepped inwardly from the top and numbered respectively 14, 15 and 16, said shoulders forming the respective bases for various sized flat bottomed glasses, as particularly shown in Figure 2, glass 17 being shown in solid lines and the smaller glass 18 shown in dotted lines.

Depending from the inner edge of shoulder 16 is a tubular portion 19 adapted for association with seat 13, said depending portion being provided with notches 20 adapted to receive ribs 12, the intermediate ears 22 straddling said ribs. The holding member is secured to the tray by spot welding at 23, binding the inner side of the tubular portion 19 and the seat 13 together in a permanent union.

Figure 8:
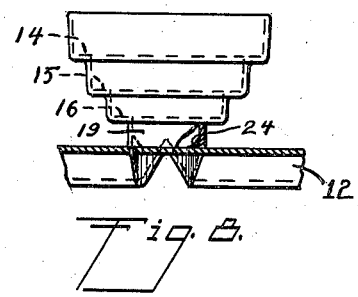
Figure 8 is a partial section of the central portion of the tray with a modified holder member welded thereto.
Figure 4:
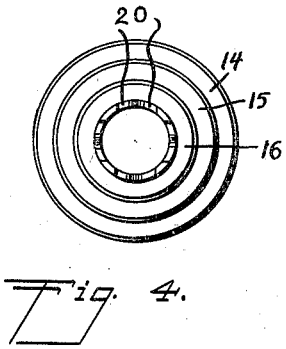
Figure 4 is a view of the under side of same.
Figure 9:
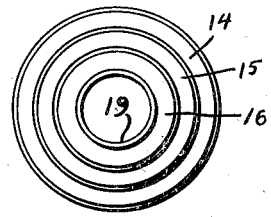
Figure 9 is a view of the under side of the modified holder member.
Figure 2:
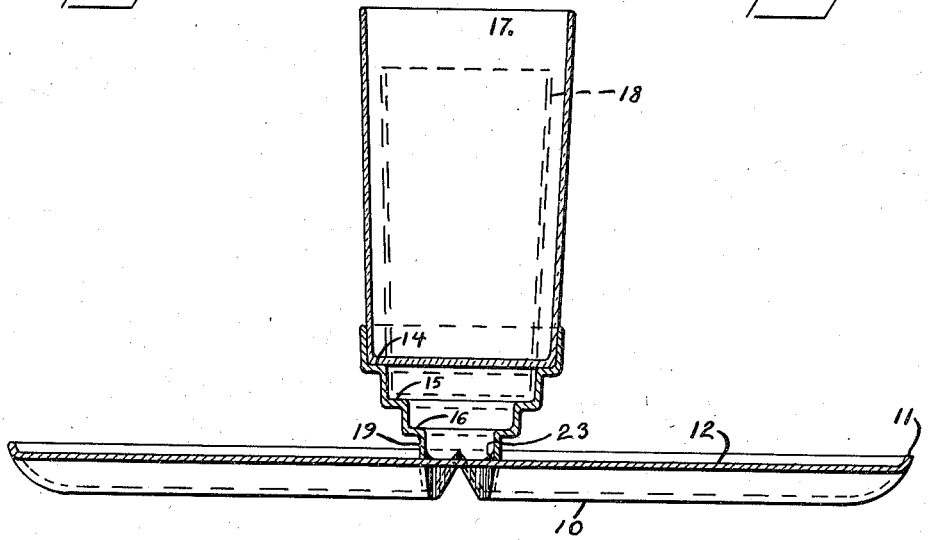
Figure 2 is a vertical section of same taken on line 2—2 of Figure 1 and includes a glass received in the holder member.

In the modified holder member, illustrated in Figures 8 and 9, the ears 22 are eliminated from the tubular member and the lower edge of said member rests on the seat 13. Spot welding at 24 binds the holder to the seat of the tray to form a permanently secured unit.

A plane extending conically downwardly in the opening of the holder would touch the inner edges of the respective shoulders so that a conical or tapering beverage container may be removably received in said holder.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof, together with a modified holder.

Having thus described my invention what I claim is:

1. In a serving device, a plate formed of a single piece of metal and having an upturned edge portion, a horizontal, raised holder seat formed integrally with the plate adjacent the center thereof, radial ribs raised from the bottom of the plate and formed integrally therewith and with the raised holder seat, a hollow holder member of metal, said holder having a plurality of shoulders stepped inwardly and downwardly from the top thereof, and a tubular portion depending from the inner edge of the lower shoulder and associated with the seat, said tubular portion having notches in the lower edge thereof in which are received the ribs, the inner side of said tubular portion being welded to the seat.

2. In a device of the class described, a plate formed of a piece of metal, a horizontal, raised holder seat formed integrally with the plate adjacent the center thereof, radial ribs raised from the bottom of the plate and formed integrally therewith and with the raised holder seat, a hollow holder member of metal, said holder having a plurality of shoulders stepped inwardly and downwardly of the top thereof, and a depending portion having notches in the lower edge thereof, said holder being secured to the holder seat by welding and with the ribs received in the notches thereof.

3. In a device of the class described, a plate formed of a piece of metal, a horizontal, raised holder seat formed integrally with the plate, radial ribs raised from the bottom of the plate and formed integrally therewith and with the holder seat, and a holder member of metal having a depending portion notched at the lower edge, said holder being secured to the holder seat with the ribs received in the notches of the depending portion.

LOUIS A. LEPPKE.